(12) United States Patent
Huang et al.

(10) Patent No.: US 12,353,347 B2
(45) Date of Patent: Jul. 8, 2025

(54) BASEBOARD MANAGEMENT CONTROL DEVICE AND CONTROL METHOD THEREOF

(71) Applicant: ASPEED Technology Inc., Hsinchu (TW)

(72) Inventors: Po-Wei Huang, Hsinchu (TW); Chih-Chiang Mao, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 249 days.

(21) Appl. No.: 18/312,582

(22) Filed: May 4, 2023

(65) Prior Publication Data
US 2024/0232116 A1 Jul. 11, 2024

(30) Foreign Application Priority Data

Jan. 9, 2023 (TW) ................................. 112100817

(51) Int. Cl.
*G06F 13/40* (2006.01)
*G06F 15/78* (2006.01)

(52) U.S. Cl.
CPC ...... *G06F 13/4068* (2013.01); *G06F 15/7839* (2013.01); *G06F 2213/0016* (2013.01); *G06F 2213/0042* (2013.01)

(58) Field of Classification Search
CPC ............. G06F 13/4068; G06F 15/7839; G06F 2213/0016; G06F 2213/0042
See application file for complete search history.

(56) References Cited

U.S. PATENT DOCUMENTS

| | | | | |
|---|---|---|---|---|
| 11,487,550 B1 * | 11/2022 | Bevis | ...................... | G06F 13/20 |
| 2014/0115112 A1 * | 4/2014 | Wang | ...................... | H04L 49/90 |
| | | | | 709/219 |
| 2015/0317277 A1 * | 11/2015 | Wang | ...................... | G06F 13/16 |
| | | | | 710/313 |
| 2015/0363340 A1 * | 12/2015 | Kelly | .................... | G06F 13/102 |
| | | | | 710/52 |

(Continued)

FOREIGN PATENT DOCUMENTS

| CN | 111158976 | 5/2020 |
|---|---|---|
| CN | 113760803 | 12/2021 |

(Continued)

OTHER PUBLICATIONS

"Notice of allowance of Taiwan Counterpart Application", issued on Oct. 30, 2023, p. 1-p. 4.

*Primary Examiner* — Phong H Dang
(74) *Attorney, Agent, or Firm* — JCIPRNET

(57) ABSTRACT

A baseboard management control device is provided. The baseboard management control device includes an input and output device and a baseboard management controller. The input and output device includes a sensing device. The sensing device is coupled to multiple input pins and multiple output pins to sense and write the target data, respectively. The baseboard management controller includes a storage device and a main processor. The storage device is configured to pre-store the target data. The main processor is coupled to the storage device and reads the target data in the storage device according to a predetermined cycle. The baseboard management controller and the input and output device are respectively located on different circuit boards.

17 Claims, 11 Drawing Sheets

(56) References Cited

U.S. PATENT DOCUMENTS

2018/0226051 A1* 8/2018 Swaminathan ........ G09G 5/006
2021/0034445 A1* 2/2021 Shuey ................ G06F 11/1625

FOREIGN PATENT DOCUMENTS

| | | |
|---|---|---|
| TW | 201800952 | 1/2018 |
| TW | 202008110 | 2/2020 |
| TW | 202221454 | 6/2022 |
| TW | 202248863 | 12/2022 |
| TW | 202301047 | 1/2023 |
| TW | 202301140 | 1/2023 |

* cited by examiner

| Parameter | Voltage (V) | Time |
|---|---|---|
| VS1 | 3.3 | 01:03:01 |
| VS2 | 3.1 | 01:03:05 |
| Parameter | Temperature in Celsius (°C) | Time |
| TEMP1 | 32 | 01:03:01 |
| TEMP2 | 30 | 01:03:05 |
| Parameter | Fan speed (RPM) | Time |
| TACH1 | 3600 | 01:03:01 |
| TACH2 | 3200 | 01:03:05 |
| Parameter | Pulse width modulation parameter (ms) | Time |
| PWM1 | 1 | 01:03:01 |
| PWM2 | 1.5 | 01:03:05 |

FIG. 9

BASEBOARD MANAGEMENT CONTROL DEVICE AND CONTROL METHOD THEREOF

CROSS-REFERENCE TO RELATED APPLICATION

This application claims the priority benefit of Taiwan application serial no. 112100817, filed on Jan. 9, 2023. The entirety of the above-mentioned patent application is hereby incorporated by reference herein and made a part of this specification.

BACKGROUND

Technical Field

The disclosure relates to a baseboard management control device and a control method thereof.

Description of Related Art

In order to enhance productivity in the digital age, computing power is the primary task to promote the digital transformation of various industries. At the same time, data platforms are gradually becoming more diversified, and the design requirements of these data platforms in memory, storage devices, accelerators, and security management devices are increasing.

However, the development standards of the central processing unit (CPU) and the security management chip usually restrict each other, thereby affecting the performance of the data platform. Therefore, it has become an important development trend of the data center to adopt a standardized module design method to be compatible with the security management requirements of different platforms. In this context, the open compute project (OCP) proposed a data center-ready secure control module (DC-SCM) server and a hardware management project. This project is a general specification for the modularization of the data center security management unit, and realizes the mutual decoupling of the computing unit and the security management unit: the three key functions such as management, security, and control are separated from the original motherboard and transferred to a smaller standard sized module (CFM), and may be connected to the motherboard through busbars and other connections. The standard sized module includes the management functions of the original baseboard management controller (BMC) on the motherboard and the low-voltage differential signaling tunneling protocol and interface (LTPI). In terms of security functions, the standard sized module includes a trusted platform module (TPM) and a hardware root of trust (RoT), etc.

In addition, the DC-SCM architecture also defines input and output (I/O) modules that operate in conjunction with host platform modules. In other words, under the DC-SCM architecture, only the basic CPU, high-speed memory, and input and output connection pins remain on the motherboard, and all other components are located on the modular management control board. Through the modularization of the security management unit, the design difficulty of the motherboard may be reduced, the design and verification time may be saved, and the use of lower-cost boards in the design process may be supported, thereby reducing the cost of the whole device. At the same time, the DC-SCM architecture decouples the development cycle of the BMC and ROT from the development cycle of the CPU, accelerates the development of security management chips and CPUs, and realizes cross-platform compatibility. In addition, the DC-SCM standard has added the design of new technologies and management interfaces, such as multi-node server design, and added high-speed peripheral component interconnect express (PCIe), universal serial bus 3.0 (USB 3.0), and improved internal integrated circuit bus ($I^3C$) interface, etc., which may greatly improve the scalability and service life of the data center platform.

However, under the DC-SCM standard of a new generation of servers, the baseboard management controller (BMC) is no longer located on the motherboard or the host platform module (HPM), but is separated from the address where the data is stored. Therefore, in the process of accessing data, the baseboard management controller (BMC) needs to perform channel communication through multiple management interfaces between the baseboard management controller and the host platform module. For example: the inter integrated circuit ($I^2C$), system management bus (SMBus) (applied to lightweight communication, e.g.: management information of temperature, voltage, current or fan sensor), universal asynchronous receiver/transmitter (UART) (used to transmit data through serial communication), or data-custom channel is used as a data transmission channel, and data access requests are transmitted through connection lines or serial communication (i.e., one bit of data is transmitted at a time on the computer bus or other similar data channels, and the communication method of the above process is continuously carried out) and parallel communication (i.e., communicating by simultaneously transmitting several bits of data on a serial port). Due to the long communication paths of serial transmission and parallel transmission in the process of data transmission, the CPU on the BMC has a relatively long CPU read latency. More importantly, due to the functional orientation of the BMC itself, the CPU on the BMC must periodically monitor or access the target data located on the host platform module, which greatly affects the performance and power consumption of the CPU. On the other hand, since multiple bits are transmitted at one time in parallel transmission, it is easy to cause interference and cause data errors due to the influence of the transmission line.

Therefore, under the DC-SCM standard, how to solve the CPU read latency between the BMC and the host platform module, and reduce the serial/parallel transmission path to achieve the stability of data transmission and increase the CPU read speed, so as to more efficiently manage the data transmission between the BMC and the host platform module under the distributed hardware system architecture has become an important issue.

SUMMARY

The disclosure provides a baseboard management control device and a control method thereof, so as to reduce the CPU read latency between the BMC and the host platform module.

According to some embodiments of the disclosure, a baseboard management control device is provided. The baseboard management control device includes an input and output device and a baseboard management controller. The input and output device includes a sensing device. The sensing device is coupled to multiple input pins and multiple output pins to respectively sense and write target data. The baseboard management controller includes a storage device and a main processor. The storage device is configured to pre-store the target data. The main processor is coupled to the storage device, and reads the target data in the storage device according to a predetermined cycle. The baseboard management controller and the input and output device are respectively located on different circuit boards.

According to some embodiments of the disclosure, a baseboard management control method is provided. The baseboard management control method includes the following operation. A read request is sent by an I/O processor of the baseboard management controller to read a target to be sensed. The target is sensed by a sensing device of an I/O device and target data is obtained. The target data is pre-stored in a storage device in an off-line state without being controlled by a main processor of the baseboard management controller. The target data in the storage device is read by the main processor according to a predetermined cycle. The target data read by the main processor is received by a determining device, and it is determined whether the target data violates a preset threshold range. If there is a violation of the preset threshold range, a reminder signal is sent. The baseboard management controller and the input and output device are respectively located on different circuit boards.

Based on the above, the disclosure provides a baseboard management control device and a control method thereof, which may effectively reduce the CPU read latency between the BMC and the host platform module, and reduce the serial/parallel transmission path to achieve the stability of data transmission and effectively improve the CPU read performance, which may more efficiently manage data transmission between the BMC and the host platform module under the distributed hardware system architecture.

In order to make the above-mentioned features and advantages of the disclosure comprehensible, embodiments accompanied with drawings are described in detail below.

BRIEF DESCRIPTION OF THE DRAWINGS

FIG. 9 is a sensing target data look-up table according to an embodiment of the disclosure.

DETAILED DESCRIPTION OF DISCLOSED EMBODIMENTS

Figure 1:
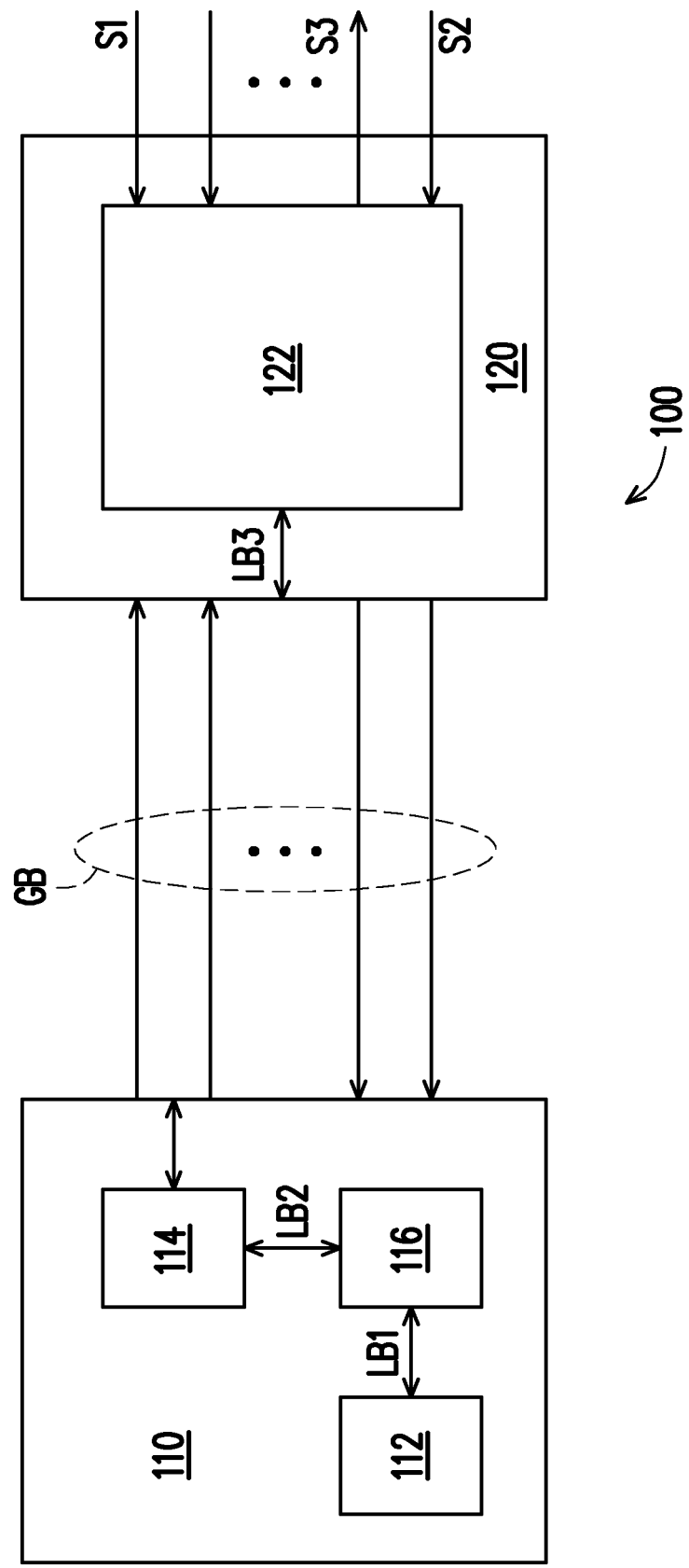
FIG. 1 is a schematic diagram of a baseboard management control device according to an embodiment of the disclosure.

The features of the inventive concept and methods of achieving the same may be more readily understood by reference to the following detailed description of the embodiments and the accompanying drawings. Hereinafter, embodiments will be described in more detail with reference to the accompanying drawings, in which the same reference numerals refer to the same elements throughout. However, the disclosure may be embodied in various different forms and should not be construed as limited to the embodiments set forth herein only. Rather, these embodiments are provided as examples so that this disclosure will be thorough and complete, and will fully convey the aspects and features of the disclosure to those skilled in the art. Therefore, processes, elements, and techniques that are not necessary for a person of ordinary skill in the art to have a complete understanding of the aspects and features of the disclosure may not be described. Unless otherwise indicated, the same reference numerals refer to the same elements throughout the accompanying drawings and written description, and thus their descriptions will not be repeated. In the drawings, the relative sizes of elements, layers, and regions may be exaggerated for clarity.

In the following description, for purposes of explanation, numerous specific details are set forth in order to provide a thorough understanding of various embodiments. It will be apparent, however, that various embodiments may be practiced without these specific details or without one or more equivalent arrangements. In other instances, well-known structures and devices are shown in block diagram form in order to avoid unnecessarily obscuring the various embodiments.

The terminology used herein is for the purpose of describing particular embodiments only and is not intended to limit the disclosure. As used herein, the singular form "a/an" is intended to include the plural form as well, unless the context clearly indicates otherwise. It should be further understood that the terms "comprises/comprising", "have/having", "includes/including" when used in this specification mean the presence of the stated features, integers, steps, operations, and/or elements, but does not preclude the presence or addition of one or more other features, integers, steps, operations, elements, and/or groups thereof. As used herein, the term "and/or" includes any and all combinations of one or more of the associated listed items.

As used herein, the terms "substantially," "about," "approximately," and similar terms are used as terms of approximation and not as terms of degree, and are intended to take into account measurements or inherent bias in calculations that would be recognized by one of ordinary skill in the art. Considering the discussed measurement and measurement-related deviation (that is, the limitation of measurement system), the usages of "about" or "approximately" include the stated value and indicate within an acceptable range of deviation from the particular value as determined by one of ordinary skill in the art. For example, "about" may mean within one or more standard deviations, or within ±30%, 20%, 10%, 5% of the stated value. Furthermore, when describing embodiments of the disclosure, the use of "may" means "one or more embodiments of the disclosure."

When a certain embodiment may be implemented in different ways, the particular order of processing may be performed differently from the described order. For example, two processes described in succession may be executed substantially concurrently or in the reverse order from that described.

Electrical or electronic devices and/or any other related devices or elements described herein in accordance with embodiments of the disclosure may utilize any suitable hardware, firmware (e.g., application specific integrated circuits), software, or a combination of software, firmware, and hardware implementations. For example, the various elements of these devices may be formed on an integrated circuit (IC) chip or on separate IC chips. In addition, various elements of these devices may be implemented in flexible printed circuit films, tape carrier packages (TCP), printed circuit board (PCB), or formed on a substrate. Furthermore, various elements of these devices may be processes or threads running on one or more processors in one or more computing devices, executing computer program instructions, and interacting with other system elements for performing the various functions described herein. Computer program instructions are stored in memory that may be implemented in a computing device using standard memory devices such as random access memory (RAM). Computer program instructions may also be stored in other non-transitory computer readable media such as CD-ROMs, flash memory drives, or the like. Furthermore, those skilled in the art will recognize that the functionality of various computing devices may be combined or integrated into a single computing device, or that the functionality of a particular computing device may be distributed over one or more other computing devices without departing from the spirit and scope of the exemplary embodiments of the disclosure.

Unless otherwise defined, all terms (including technical and scientific terms) used herein have the same meaning as commonly understood by one of ordinary skill in the art to which this disclosure belongs. It should be further understood that terms such as those defined in commonly used dictionaries should be construed as having meanings consistent with their meanings in the context of the related art and/or this specification, and are not to be construed as idealized or excessive formal meaning, unless expressly defined as such herein.

A board management controller (BMC) is originally a core control element on the motherboard, which may be used to manage and connect modules and elements with different functions on the motherboard, so that the elements on the motherboard may operate normally through BMC management. Under the DC-SCM standard of the new generation of servers, although the BMC is separated from the motherboard, it may still detect whether the elements on the motherboard are abnormal by collecting the operation data of individual elements on the baseboard and serially connected hardware. If an abnormal incident is detected, the BMC automatically sends a warning or reminder message to the user, and the user may repair and troubleshoot according to the information provided by the BMC. The main advantage of BMC is that it allows system users to perform various monitoring and management tasks remotely without being physically connected to the system, such as power cycling, BIOS installation, or firmware updates, and may be used to monitor fan speed and system temperature. If a hardware incident arises (e.g., the hard disk, fan or power supply needs to be replaced) or other errors or failures occurs, the BMC may notify the user through reminder messages or warning messages. Therefore, users no longer need to be physically connected to each server in the rack to perform maintenance operations. In a modern data center, typically with hundreds of racks and thousands of servers, it would be difficult to maintain without a BMC. Therefore, all servers and other equipment (e.g., switches, storage devices, power supply equipment, etc.) used in data centers or distributed systems mostly have BMC devices.

FIG. 1 is a schematic diagram of a baseboard management control device according to an embodiment of the disclosure.

Referring to FIG. 1, in this embodiment, a baseboard management control device 100 includes an input and output device (I/O device or I/O expander) 120 and a baseboard management controller (or BMC) 110.

In this embodiment, the input and output device 120 includes a sensing device 122. The sensing device 122 is coupled to multiple input pins and multiple output pins to respectively sense the target and obtain sensing data S1 and S2, and write the writing data S3 into the target through the input and output device 120. For convenience, the sensing data S1 and S2 and the writing data S3 may be referred to as target data hereinafter. In some embodiments, the target data S1 and S2 may include fan speed information, system voltage information, system temperature information, etc., which are not limited in this embodiment. The target data S3 may be, for example, pulse width modulation (PWM) information, which is not limited in this embodiment.

In this embodiment, the baseboard management controller 110 includes an input and output processor (or I/O CPU) 114, a storage device 116 (or a general purpose register, a memory register), and a main processor (main CPU) 112. The storage device 116 may be configured to pre-store the target data S1 and S2. The main processor 112 is coupled to the storage device 116 through a local bus LB1, and reads the target data S1 and S2 in the storage device 116 according to a predetermined cycle. The input and output processor 114 is coupled to the storage device 116 through another local bus LB2. The baseboard management controller 110 and the input and output device 120 are respectively located on different circuit boards. In other words, the input and output device 120 is located on the motherboard, but the baseboard management controller 110 is not located on the motherboard. Therefore, serial communication and parallel communication are performed between the input and output device 120 and the baseboard management controller 110 through a global bus GB to transmit data access requests. Serial communication is a communication method in which one bit of data is transmitted at a time on a computer bus or other similar data channels, and the above process is continuously carried out. Parallel communication is to communicate by simultaneously transmitting multiple bits of data on the serial port.

In this embodiment, the sensing device 122 receives the prefetch read request from the input and output processor 114 through a local bus LB3, and returns the target data S1 and S2 of the sensed target to the storage device 116 in the baseboard management controller 110 through the local bus LB3 and the global bus GB for pre-storage. For example, before the main processor 112 is in use or has not read the target data S1 and S2, the input and output processor 114 may be in an empty window from work (i.e., the idle time of the input and output processor 114), prefetch the read request, and pre-store the target data S1 and S2 in a storage device relatively close to the main processor 112. Therefore, when the main processor 112 reads the target data S1 and S2, in addition to reducing the waiting time for reading the target data S1 and S2 in the reading cycle of the main processor 112, the data transmission latency for the main processor 112 to perform serial and parallel transmission through the global bus GB to read the target data S1 and S2 at the input and output device 120 may also be reduced.

Figure 2:
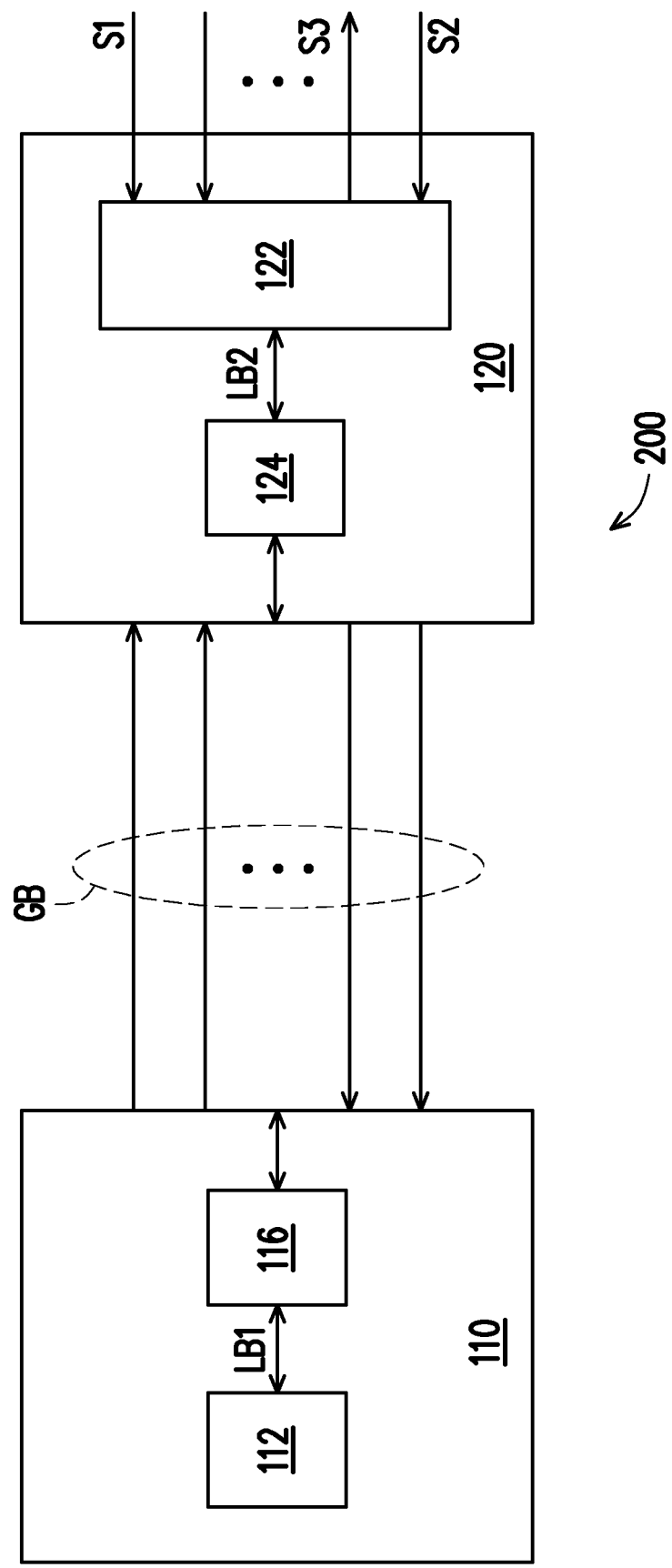
FIG. 2 is a schematic diagram of a baseboard management control device according to another embodiment of the disclosure.

FIG. 2 is a schematic diagram of a baseboard management control device according to another embodiment of the disclosure.

Referring to FIG. 2, in this embodiment, a baseboard management control device 200 includes an input and output device (I/O device or I/O expander) 120 and a baseboard management controller (or BMC) 110.

In this embodiment, the input and output device 120 includes a sensing device 122 and a device CPU 124. The sensing device 122 is coupled to multiple input pins and multiple output pins to respectively sense the target and obtain sensing data S1 and S2, and write the writing data S3 into the target through the input and output device 120. The sensing device 122 is also coupled to the device processor 124 through a local bus LB2. In some embodiments, the target data S1 and S2 may include fan speed information, system voltage information, system temperature information, etc., which are not limited in this embodiment. The target data S3 may be, for example, pulse width modulation (PWM) information, which is not limited in this embodiment.

In this embodiment, the baseboard management controller 110 includes a main processor (main CPU) 112 and a storage device 116 (or a general purpose register, a memory register). The storage device 116 may be configured to pre-store the target data S1 and S2. The main processor 112 is coupled to the storage device 116 through a local bus LB1, and reads the target data S1 and S2 in the storage device 116 according to a predetermined cycle. The storage device 116 is coupled to the device processor 124 of the input and output device 120 through a global bus GB. In this embodiment, the baseboard management controller 110 and the input and output device 120 are respectively located on different circuit boards. In some embodiments, the baseboard management controller 110 and the input and output device 120 are respectively located on independent distributed systems.

In this embodiment, the sensing device 122 receives a prefetch read request periodically sent from the device processor 124 through a local bus LB2, and returns the target data of the sensed target to the device processor 124 through the local bus LB2, and the device processor 124 returns the target data to the storage device 116 in the baseboard management controller 110 through the global bus GB for pre-storage. For example, the device processor 124 may perform a prefetch read request when the main processor 112 has not yet used or read the target data S1 and S2, and may pre-store the target data S1 and S2 in the storage device 116 relatively close to the main processor 112 through the global bus GB. Therefore, when the main processor 112 reads the target data S1 and S2, in addition to reducing the waiting time for reading the target data S1 and S2 in the reading cycle of the main processor 112, the data transmission latency for the main processor 112 to perform serial (or parallel) transmission through the global bus GB to read the target data at the input and output device 120 may also be reduced. It should be noted that the device processor 124 periodically sends a prefetch read request, so that the target data S1 and S2 in the storage device 116 may be updated within a predetermined cycle to ensure that the main processor 112 may read the latest target data S1 and S2.

Figure 3:
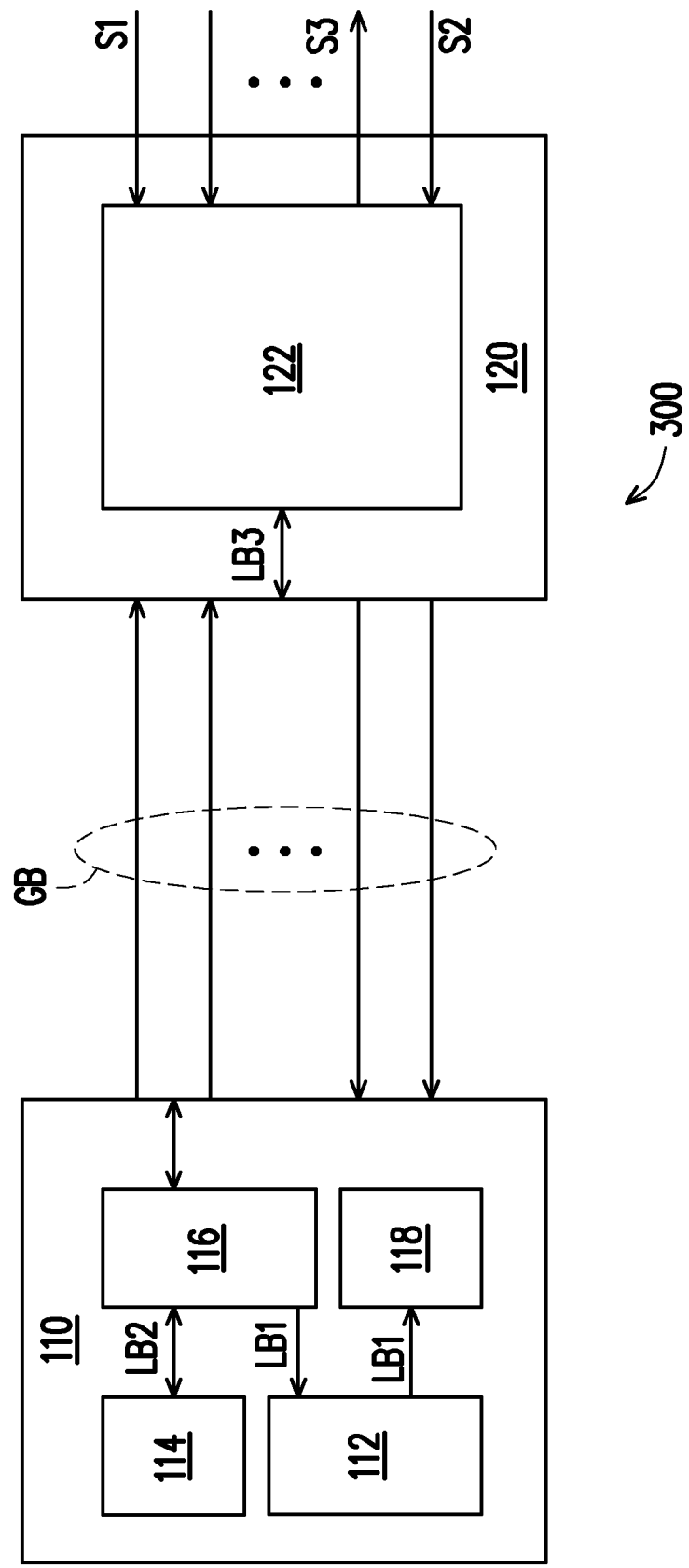
FIG. 3 is a schematic diagram of a baseboard management control device according to another embodiment of the disclosure.

FIG. 3 is a schematic diagram of a baseboard management control device according to another embodiment of the disclosure.

Referring to FIG. 3, in this embodiment, a baseboard management control device 300 includes an input and output device (I/O device or I/O expander) 120 and a baseboard management controller (or BMC) 110.

In this embodiment, the input and output device 120 includes a sensing device 122. The sensing device 122 is coupled to multiple input pins and multiple output pins to respectively sense the target and obtain sensing data S1 and S2, and write the writing data S3 into the target through the input and output device 120. In some embodiments, the target data S1 and S2 may include fan speed information, system voltage information, system temperature information, etc., which are not limited in this embodiment. The target data S3 may be, for example, pulse width modulation (PWM) information, which is not limited in this embodiment.

In this embodiment, the baseboard management controller 110 includes an input and output processor (or I/O CPU) 114, a storage device 116 (or a general purpose register, a memory register 116), a determining device 118, and a main processor 112. The storage device 116 may be configured to pre-store the target data S1 and S2. The main processor 112 is coupled to the storage device 116 and the determining device 118 through a local bus LB1, and reads the target data S1 and S2 in the storage device 116 according to a predetermined cycle. The input and output processor 114 is coupled to the storage device 116 through another local bus LB2. The baseboard management controller 110 and the input and output device 120 are respectively located on different circuit boards. In other words, the input and output device 120 is located on the motherboard, but the baseboard management controller 110 is not located on the motherboard.

In this embodiment, the sensing device 122 receives the prefetch read request from the input and output processor 114 through a local bus LB3, and returns the target data S1 and S2 of the sensed target to the storage device 116 in the baseboard management controller 110 through the local bus LB3 and the global bus GB for pre-storage. In some embodiments, the input and output processor 114 is not only responsible for reading the target data, but also responsible for controlling the channel transmission of other interfaces, such as: inter-integrated circuit bus, ($I^2C$ bus), universal asynchronous receiver/transmitter (UART), general-purpose input/output (GPIO), etc. Therefore, different from sending prefetch read requests periodically, before the main processor 112 is in use or has not read the target data S1 and S2, the input and output processor 114 may be in an empty window from work (idle time), prefetch the read request, and pre-store the target data S1 and S2 in a storage device 116 relatively close to the main processor 112. Therefore, when the main processor 112 reads the target data S1 and S2, in addition to reducing the waiting time for reading the target data S1 and S2 in the reading cycle of the main processor 112, the data transmission latency for the main processor 112 to perform serial and parallel transmission through the global bus GB to read the target data S1 and S2 at the input and output device 120 may also be reduced.

In this embodiment, the storage device 116 stores the target data S1 and S2 transmitted by the sensing device 122, and establishes a look-up table according to the target data S1 and S2 (please refer to FIG. 9 below). The look-up table records target data values of different modes sensed at predetermined time points for the main processor 112 to inquire. For example, the look-up table includes the voltage value of sensor #1 at the first time point, the voltage value of sensor #1 at the second time point, the voltage value of sensor #2 at the first time point, the voltage value of sensor #2 at the second time point, the temperature value of sensor #1 at the first time point, the temperature value of sensor #1 at the second time point, the temperature value of sensor #2 at the first time point, the temperature value of sensor #2 at the second time point, the fan speed value of sensor #1 at the first time point, the fan speed value of sensor #1 at the second time point, the fan speed value of sensor #2 at the first time point, and the fan speed value of sensor #2 at the second time point, but the disclosure is not limited thereto.

In this embodiment, the main processor 112 transmits the target data S1 and S2 that is inquired from the look-up table to the determining device 118. The determining device 118 has built-in corresponding predetermined threshold ranges for different sensing targets. When the main processor 112 receives the target data S1 and S2 inquired from the look-up table, the main processor 112 determines whether the target data S1 and S2 meet the corresponding predetermined threshold range. If the predetermined threshold range is exceeded, the main processor 112 automatically sends a reminder signal ALM to a higher level (network administrator or user). Therefore, the user may perform remote diagnosis according to the information provided by the determining device 118 and immediately eliminate the problem or abnormal incident caused by the sensing target, so that the elements on the motherboard may continue to operate through the management of the baseboard management controller 110.

Figure 4:
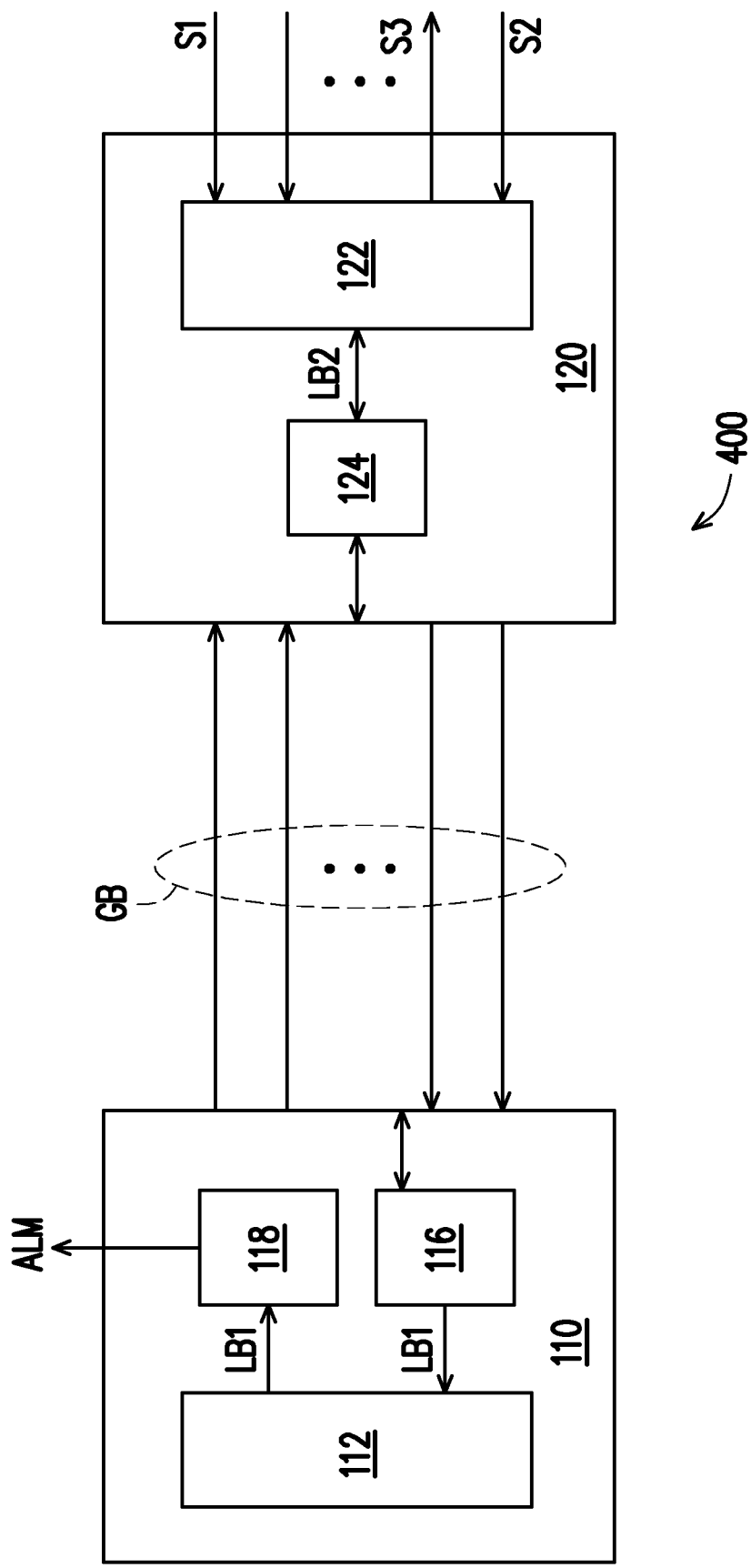
FIG. 4 is a schematic diagram of a baseboard management control device according to another embodiment of the disclosure.

FIG. 4 is a schematic diagram of a baseboard management control device according to another embodiment of the disclosure.

Referring to FIG. 4, in this embodiment, a baseboard management control device 400 includes an input and output device (I/O device or I/O expander) 120 and a baseboard management controller (or BMC) 110.

In this embodiment, the input and output device 120 includes a sensing device 122 and a device processor 124. The sensing device 122 is coupled to multiple input pins and multiple output pins to respectively sense the target and obtain sensing data S1 and S2, and write the writing data S3 into the target through the input and output device 120. The sensing device 122 is also coupled to the device processor 124 through a local bus LB2. In some embodiments, the target data S1 and S2 may include fan speed information, system voltage information, system temperature information, etc., which are not limited in this embodiment. The target data S3 may be, for example, pulse width modulation (PWM) information.

In this embodiment, the baseboard management controller 110 includes a main processor 112, a storage device 116 (or a general purpose register, a memory register), and a determining device 118. The storage device 116 may be configured to pre-store the target data S1 and S2. The main processor 112 is coupled to the storage device 116 and the determining device 118 through a local bus LB1, and reads the target data S1 and S2 in the storage device 116 according to a predetermined cycle. The storage device 116 is coupled to the device processor 124 of the input and output device 120 through a global bus GB. In this embodiment, the baseboard management controller 110 and the input and output device 120 are respectively located on different circuit boards. In some embodiments, the baseboard management controller 110 and the input and output device 120 are respectively located on independent distributed systems.

In this embodiment, the sensing device 122 receives a prefetch read request periodically sent from the device processor 124 through a local bus LB2, and returns the target data of the sensed target to the device processor 124 through the local bus LB2, and the device processor 124 returns the target data to the storage device 116 in the baseboard management controller 110 through the global bus GB for pre-storage. For example, the device processor 124 may perform a prefetch read request when the main processor 112 has not yet used or read (or accessed) the target data S1 and S2, and may pre-store the target data S1 and S2 in the storage device 116 relatively close to the main processor 112 through the global bus GB. Therefore, when the main processor 112 reads the target data S1 and S2, in addition to reducing the waiting time for reading the target data S1 and S2 in the reading cycle of the main processor 112, the data transmission latency for the main processor 112 to perform serial (or parallel) transmission through the global bus GB to read the target data at the input and output device 120 may also be reduced. It should be noted that the device processor 124 periodically sends a prefetch read request, so that the target data S1 and S2 in the storage device 116 may be updated within a predetermined cycle to ensure that the main processor 112 may read the latest target data S1 and S2.

In this embodiment, the storage device 116 stores the target data S1 and S2 transmitted by the sensing device 122, and establishes a look-up table according to the target data S1 and S2 (please refer to FIG. 9 below). The look-up table records target data values of different modes sensed at predetermined time points for the main processor 112 to inquire. For example, the look-up table includes the voltage value of sensor #1 at the first time point, the voltage value of sensor #1 at the second time point, the voltage value of sensor #2 at the first time point, the voltage value of sensor #2 at the second time point, the temperature value of sensor #1 at the first time point, the temperature value of sensor #1 at the second time point, the temperature value of sensor #2 at the first time point, the temperature value of sensor #2 at the second time point, the fan speed value of sensor #1 at the first time point, the fan speed value of sensor #1 at the second time point, the fan speed value of sensor #2 at the first time point, and the fan speed value of sensor #2 at the second time point, but the disclosure is not limited thereto.

In this embodiment, the main processor 112 transmits the target data S1 and S2 queried from the look-up table to the determining device 118 through the local bus LB1. The determining device 118 is pre-built with corresponding predetermined threshold ranges for different sensing targets. When the main processor 112 receives the target data S1 and S2 inquired from the look-up table, the main processor 112 determines whether the target data S1 and S2 meet the corresponding predetermined threshold range. If the predetermined threshold range is exceeded, the main processor 112 automatically sends a reminder signal ALM to a higher level (network administrator or user). For example, the sensing device 122 uses an analog-to-digital converter (ADC) to monitor various voltages of the system. The preset normal voltage range is 3.3 volts (V) (+/−10%). If the target voltage received by the determining device 118 is greater than 10% of the threshold range and exceeds 3.6 volts, it may be regarded as greater than the threshold value and is a violation. If the received target voltage is less than 10% of the threshold range, that is, less than 3 volts, it may be regarded as less than the threshold value and is a violation. That is to say, a warning or reminder signal ALM is sent through the determining device 118 for any voltage exceeding the threshold range. Therefore, the user may perform remote diagnosis according to the information provided by the determining device 118 and immediately eliminate the problems or abnormal incident caused by the sensing target, so that the elements on the motherboard may continue to operate through the management of the baseboard management controller 110.

In some embodiments, the determining device 118 may use the difference (or perform difference calculation) between the value detected in the current reading cycle and the value viewed in the next reading cycle of the main processor 112 as the determining process. When the difference that is read exceeds the predetermined difference range, a warning or reminder signal ALM is sent through the determining device 118.

Figure 5:
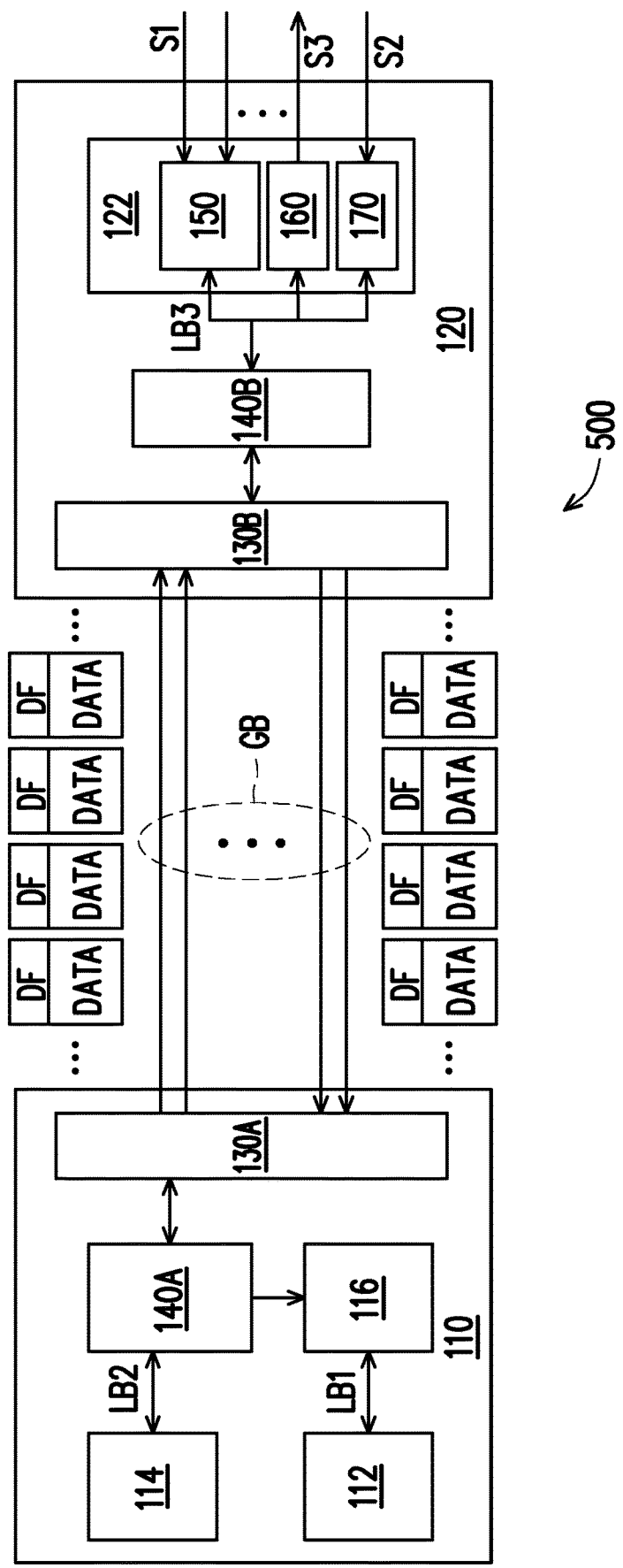
FIG. 5 is a schematic diagram of a baseboard management control device according to another embodiment of the disclosure.

FIG. 5 is a schematic diagram of a baseboard management control device according to another embodiment of the disclosure.

Referring to FIG. 5, in this embodiment, a baseboard management control device 500 includes an input and output device (I/O device or I/O expander) 120 and a baseboard management controller (or BMC) 110.

In this embodiment, the input and output device 120 includes a sensing device 122, a packet-to-host module 140B and a low-voltage differential signaling tunneling protocol and interface (LTPI) 130B. The sensing device 122 includes a voltage sensing module 150, a pulse modulation module 160, and a temperature sensing and fan speed module 170. The voltage sensing module 150 is coupled to multiple input pins (e.g., 16 channels) and receives voltage sensing data S1 from a sensing target. The temperature sensing module and/or fan speed module (tachometer) 170 is coupled to multiple input pins and receives temperature sensing data or fan speed sensing data S2 from a sensing target. For example, the temperature sensing and fan speed module 170 is coupled to 16 channels (or pins), which means it may control or read the speed of 16 fans. The pulse modulation module 160 is coupled to multiple output pins to respectively write the corresponding writing data S3 into the target through the input and output device 120.

In this embodiment, the baseboard management controller 110 includes an input and output processor (or I/O CPU) 114, a storage device 116 (or a general purpose register, a memory register 116), a low-voltage differential signaling tunneling protocol and interface 130A, a host-to-packet module 140A, and a main processor 112. The storage device 116 may be configured to pre-store voltage sensing data S1, temperature sensing data and/or fan speed sensing data S2. The main processor 112 is coupled to the storage device 116 through a local bus LB1, and reads the voltage sensing data S1, temperature sensing data and/or fan speed sensing data S2 in the storage device 116 according to a predetermined cycle. The input and output processor 114 is coupled to the host-to-packet module 140A through another local bus LB2. The baseboard management controller 110 and the input and output device 120 are respectively located on different circuit boards. In other words, the input and output device 120 is located on the motherboard, but the baseboard management controller 110 is not located on the motherboard. Therefore, serial communication and/or parallel communication are performed between the input and output device 120 and the baseboard management controller 110 through a global bus GB to transmit data access requests.

In this embodiment, the packet-to-host module 140B is coupled to the sensing device 122 and the low-voltage differential signaling tunneling protocol and interface 130B through a local bus LB3. After receiving the read request sent by the input and output processor 114, the packet-to-host module 140B may form packets of multiple target data S1 and S2 sent from the sensing device 122 and send the packets to the low-voltage differential signaling tunneling protocol and interface 130B. Then, the low-voltage differential signaling tunneling protocol and interface 130A is returned through the global bus GB located among multiple data frames DF containing the data DATA. The low-voltage differential signaling tunneling protocol and interface 130A then transmits the packet data to the host-to-packet module 140A to unpack the packet into raw data, and then the raw data is transmitted to the storage device 116 for pre-storage of the target data. The raw data may, for example, include voltage sensing data S1, temperature sensing data and/or fan speed sensing data S2, which is not limited in the disclosure.

In some embodiments, the low-voltage differential signaling tunneling protocol and interfaces (LTPI) 130A and 130B are used to transmit various low-speed signals between the host platform module (HPM) (or motherboard) (e.g., the input and output device 120) and the DC-SCM module (e.g., the baseboard management controller 110). Compared with the general purpose input/output (GPIO) interface, it provides higher bandwidth and better scalability. The LTPI interface not only supports GPIO, but also supports channel transmission of low-speed serial interfaces such as a system management bus (SMBus), an inter-integrated circuit bus ($I^2C$) and a universal asynchronous receiver/transmitter (UART). In some embodiments, the low-voltage differential signaling tunneling protocol and interfaces 130A and 130B may also be extended by additional interfaces, and provide support for raw data channel transmission between HPM complex programmable logic devices (CPLDs) and SCM complex programmable logic devices.

Figure 6:
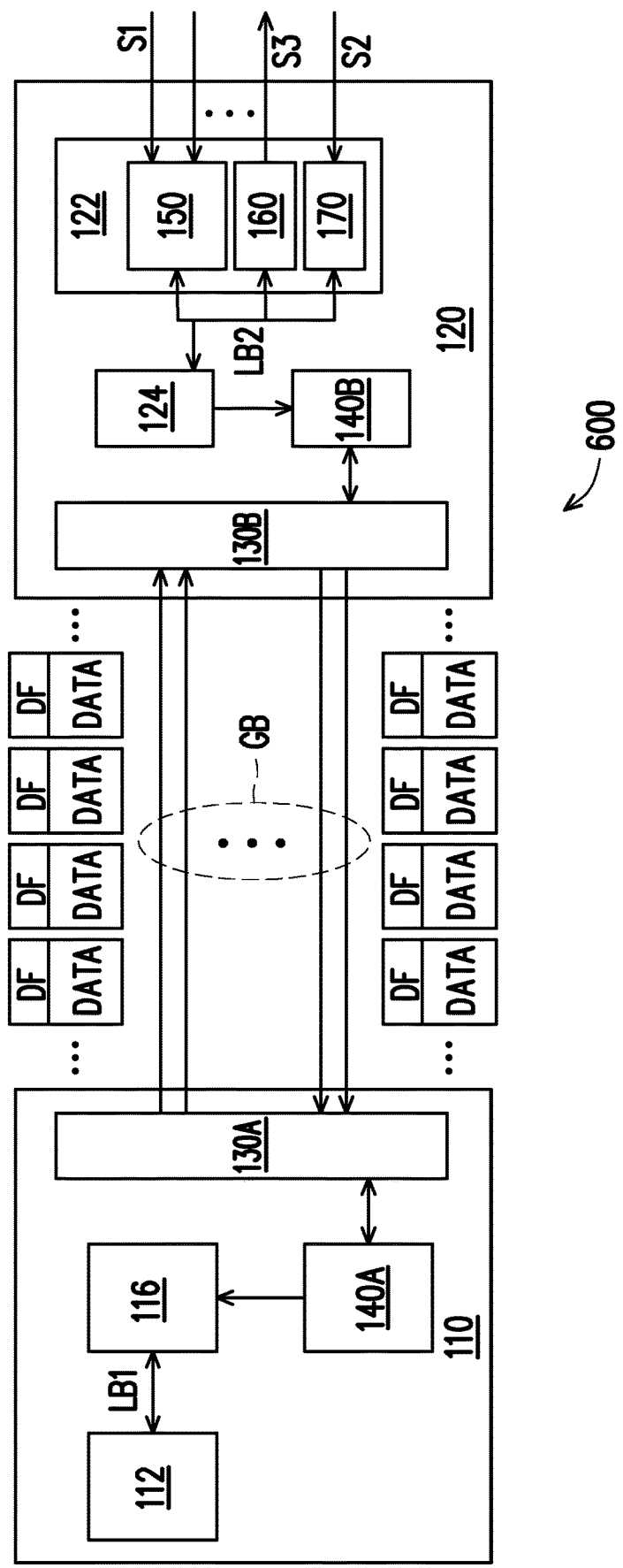
FIG. 6 is a schematic diagram of a baseboard management control device according to another embodiment of the disclosure.

FIG. 6 is a schematic diagram of a baseboard management control device according to another embodiment of the disclosure.

Referring to FIG. 6, in this embodiment, a baseboard management control device 600 includes an input and output device (I/O device or I/O expander) 120 and a baseboard management controller (or BMC) 110.

In this embodiment, the input and output device 120 includes a sensing device 122, a device processor 124, a packet-to-host module 140B, and a low-voltage differential signaling tunneling protocol and interface 130B. The sensing device 122 includes a voltage sensing module 150, a pulse modulation module 160, and a temperature sensing and fan speed module 170. The voltage sensing module 150 is coupled to multiple input pins (e.g., 16 channels) and receives voltage sensing data S1 from a sensing target. The temperature sensing module and/or fan speed module 170 is coupled to multiple input pins and receives temperature sensing data or fan speed sensing data S2 from a sensing target. The pulse modulation module 160 is coupled to multiple output pins to respectively write the corresponding writing data S3 into the target through the input and output device 120.

In this embodiment, the baseboard management controller 110 includes a storage device 116 (or a general purpose register, a memory register 116), a low-voltage differential signaling tunneling protocol and interface 130A, a host-to-packet module 140A, and a main processor 112. The storage device 116 may be configured to pre-store voltage sensing data S1, temperature sensing data and/or fan speed sensing data S2. The main processor 112 is coupled to the storage device 116 through a local bus LB1, and reads the voltage sensing data S1, temperature sensing data and/or fan speed sensing data S2 in the storage device 116 according to a predetermined cycle. The storage device 116 is coupled to the host-to-packet module 140A. The baseboard management controller 110 and the input and output device 120 are respectively located on different circuit boards. In other words, the input and output device 120 is located on the motherboard, but the baseboard management controller 110 is not located on the motherboard. Therefore, serial communication and/or parallel communication are performed between the input and output device 120 and the baseboard management controller 110 through a global bus GB to transmit data access requests.

In this embodiment, the device processor 124 receives the sensing target data S1 and S2 of the sensing device 122 through a local bus LB2, and transmits the target data S1 and S2 to the packet-to-host module 140B. The packet-to-host module 140B is coupled to the sensing device 122 and the low-voltage differential signaling tunneling protocol and interface 130B. After receiving the read request sent by the device processor 124, the packet-to-host module 140B may form packets of multiple target data S1 and S2 sent from the device processor 124 and send the packets to the low-voltage differential signaling tunneling protocol and interface 130B. Then, the low-voltage differential signaling tunneling protocol and interface 130A is returned through the global bus GB located among multiple data frames DF containing the data DATA. The low-voltage differential signaling tunneling protocol and interface 130A then transmits the packet data to the host-to-packet module 140A to unpack the packet into raw data, and then the raw data is transmitted to the storage device 116 for pre-storage of the target data. The raw data may, for example, include voltage sensing data S1, temperature sensing data and/or fan speed sensing data S2, which is not limited in the disclosure.

Figure 7:
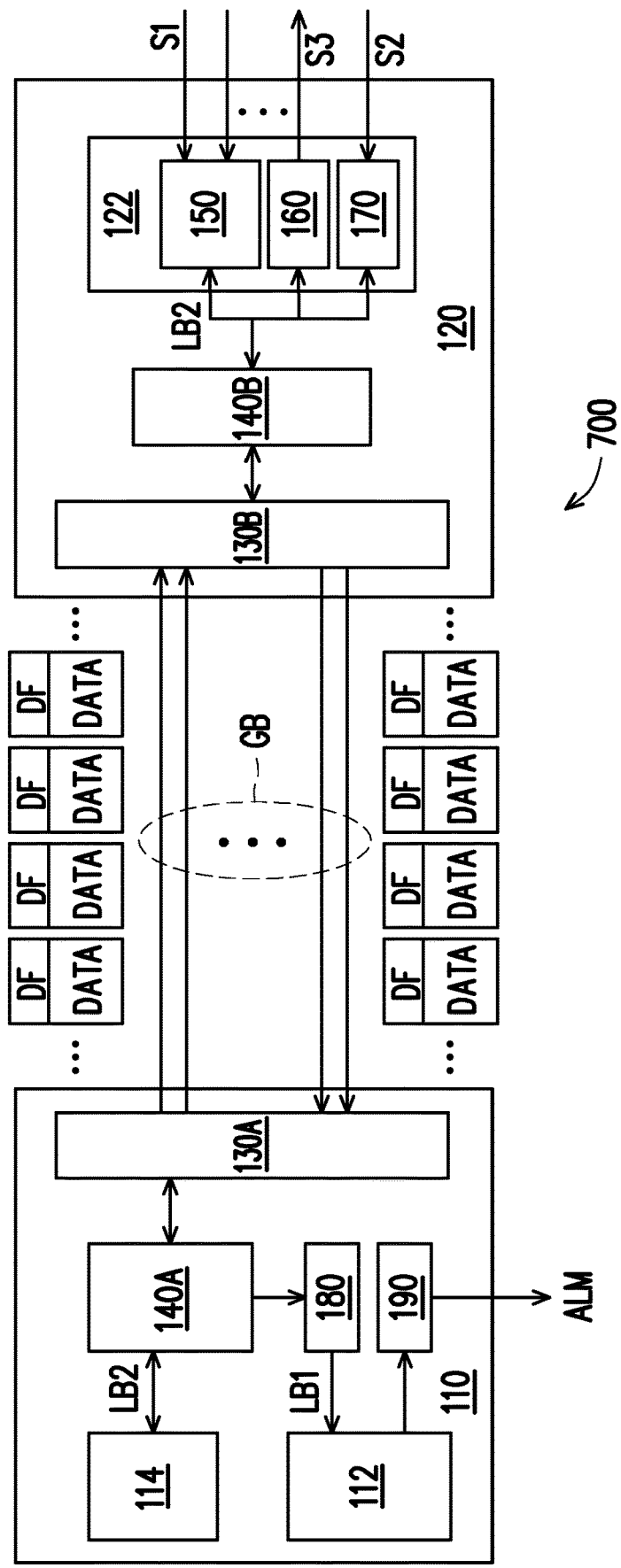
FIG. 7 is a schematic diagram of a baseboard management control device according to another embodiment of the disclosure.

FIG. 7 is a schematic diagram of a baseboard management control device according to another embodiment of the disclosure.

Referring to FIG. 7, in this embodiment, a baseboard management control device 700 includes an input and output device (I/O device or I/O expander) 120 and a baseboard management controller (or BMC) 110.

In this embodiment, the input and output device 120 includes a sensing device 122, a packet-to-host module 140B, and a low-voltage differential signaling tunneling protocol and interface 130B. The sensing device 122 includes a voltage sensing module 150, a pulse modulation module 160, and a temperature sensing and fan speed module 170. The voltage sensing module 150 is coupled to multiple input pins (e.g., 16 channels) and receives voltage sensing data S1 from a sensing target. The temperature sensing module and/or fan speed module 170 is coupled to multiple input pins and receives temperature sensing data or fan speed sensing data S2 from a sensing target. The pulse modulation module 160 is coupled to multiple output pins to respectively write the corresponding writing data S3 into the target through the input and output device 120.

In this embodiment, the baseboard management controller 110 includes an input and output processor (or I/O CPU) 114, a storage device 180 (or a general purpose register, a memory register 116, or a memory block), a determining device 190, a low-voltage differential signaling tunneling protocol and interface 130A, a host-to-packet module 140A, and a main processor 112. The storage device 180 may be configured to pre-store voltage sensing data S1, temperature sensing data and/or fan speed sensing data S2. The main processor 112 is coupled to the storage device 180 and the determining device 190 through a local bus LB1, and reads the voltage sensing data S1, temperature sensing data and/or fan speed sensing data S2 in the storage device 180 according to a predetermined cycle. The input and output processor 114 is coupled to the host-to-packet module 140A through another local bus LB2. The baseboard management controller 110 and the input and output device 120 are respectively located on different circuit boards. In other words, the input and output device 120 is located on the motherboard, but the baseboard management controller 110 is not located on the motherboard. Therefore, serial communication and/or parallel communication are performed between the input and output device 120 and the baseboard management controller 110 through a global bus GB to transmit data access requests. In some embodiments, the main processor 112 and the input and output processor 114 have different read speeds. In some embodiments, the input and output processor 114 sends a read request and updates the target data S1 and S2 in the storage device 180 during the empty window from work (or idle time).

In this embodiment, the sensing device 122 receives the prefetch read request from the input and output processor 114 through a local bus LB3, and transmits the target data S1 and S2 to the packet-to-host module 140B and the low-voltage differential signaling tunneling protocol and interface 130B. Then, the target data S1 and S2 of the sensed target are sequentially returned to the low-voltage differential signaling tunneling protocol and interface 130A in the baseboard management controller 110 through the global bus GB located between multiple data frames DF containing the data DATA. The low-voltage differential signaling tunneling protocol and interface 130A then transmits the packet data to the host-to-packet module 140A to unpack the packet to the raw data, and then transmits the raw data to the storage device 180 for pre-storage of the target data. For example, before the main processor 112 is in use or has not read the target data S1 and S2, the input and output processor 114 may be in an empty window from work (idle time), prefetch the read request, and pre-store the target data S1 and S2 in a storage device 180 relatively close to the main processor 112. Therefore, when the main processor 112 reads the target data S1 and S2, in addition to reducing the waiting time for reading the target data S1 and S2 in the reading cycle of the main processor 112, the data transmission latency for the main processor 112 to perform serial and parallel transmission through the global bus GB to read the target data S1 and S2 at the input and output device 120 may also be reduced. In some embodiments, the input and output processor is also coupled to the inter-integrated circuit bus, the universal asynchronous receiver/transmitter, and the universal input and output bus (not shown).

In this embodiment, the storage device 180 stores the target data S1 and S2 transmitted by the sensing device 122, and establishes a look-up table according to the target data S1 and S2 (please refer to FIG. 9 below). The look-up table records target data values of different modes sensed at predetermined time points for the main processor 112 to inquire. For example, the look-up table may include the voltage value of sensor #1 at the first time point, the voltage value of sensor #1 at the second time point, the voltage value of sensor #2 at the first time point, the voltage value of sensor #2 at the second time point, the temperature value of sensor #1 at the first time point, the temperature value of sensor #1 at the second time point, the temperature value of sensor #2 at the first time point, the temperature value of sensor #2 at the second time point, the fan speed value of sensor #1 at the first time point, the fan speed value of sensor #1 at the second time point, the fan speed value of sensor #2 at the first time point, and the fan speed value of sensor #2 at the second time point, but the disclosure is not limited thereto.

In this embodiment, the main processor 112 transmits the target data S1 and S2 that is inquired from the look-up table to the determining device 190. The determining device 190 has built-in corresponding predetermined threshold ranges for different sensing targets. When the main processor 112 receives the target data S1 and S2 inquired from the look-up table, the main processor 112 determines whether the target data S1 and S2 meet the corresponding predetermined threshold range. If the predetermined threshold range is exceeded, the main processor 112 automatically sends a reminder signal ALM to a higher level (network administrator or user). For example, the determining device 190 presets that, for example, if the rotation speed per minute is lower than a predetermined threshold value, it means that the possibility of a fan failure is extremely high. In addition, in some embodiments, the determining device 190 presets, for example, a fan brand, a preset fan speed, a maximum fan speed, and a minimum fan speed. Therefore, the user may perform remote diagnosis according to the information provided by the determining device 118 and immediately eliminate the problems or abnormal incident caused by the sensing target, so that the elements on the motherboard may continue to operate through the management of the baseboard management controller 110. In some embodiments, the input and output processor 114 may also be configured to compare whether the target data S1 and S2 violate a preset threshold range, and send a reminder signal if there is a violation of the preset threshold range.

Figure 8:
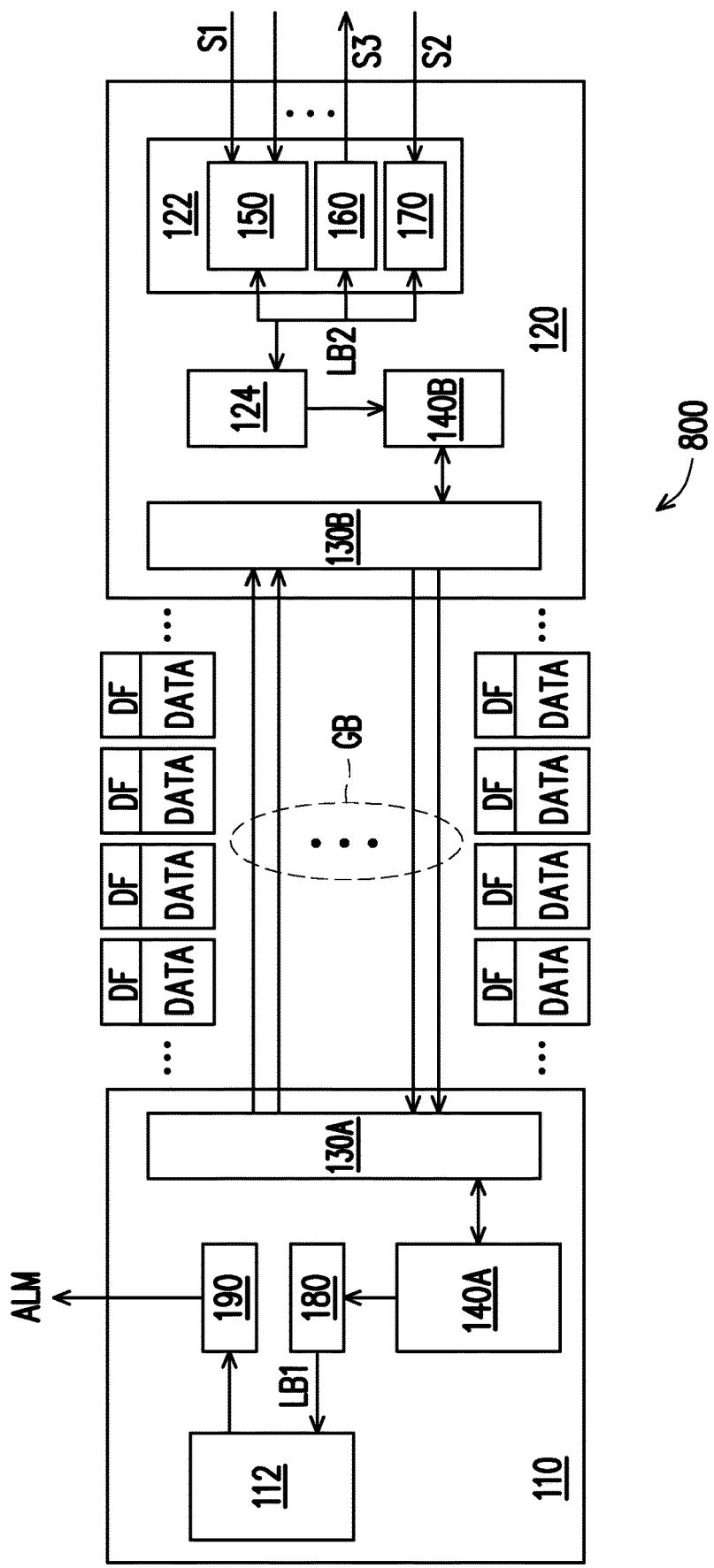
FIG. 8 is a schematic diagram of a baseboard management control device according to another embodiment of the disclosure.

FIG. 8 is a schematic diagram of a baseboard management control device according to another embodiment of the disclosure.

Referring to FIG. 8, in this embodiment, a baseboard management control device 800 includes an input and output device (I/O device or I/O expander) 120 and a baseboard management controller (or BMC) 110.

In this embodiment, the input and output device 120 includes a sensing device 122, a device processor 124, a packet-to-host module 140B, and a low-voltage differential signaling tunneling protocol and interface 130B. The sensing device 122 includes a voltage sensing module 150, a pulse modulation module 160, and a temperature sensing and fan speed module 170. The voltage sensing module 150 is coupled to multiple input pins (e.g., 16 channels) and receives voltage sensing data S1 from a sensing target. The temperature sensing module and/or fan speed module 170 is coupled to multiple input pins and receives temperature sensing data or fan speed sensing data S2 from a sensing target. The pulse modulation module 160 is coupled to multiple output pins to respectively write the corresponding writing data S3 into the target through the input and output device 120.

In this embodiment, the baseboard management controller 110 includes a storage device 180 (or a general purpose register, a memory register 116), a determining device 190, a low-voltage differential signaling tunneling protocol and interface 130A, a host-to-packet module 140A, and a main processor 112. The storage device 180 may be configured to pre-store voltage sensing data S1, temperature sensing data and/or fan speed sensing data S2. The main processor 112 is coupled to the storage device 180 and the determining device 190 and reads the voltage sensing data S1, temperature sensing data and/or fan speed sensing data S2 in the storage device 180 according to a predetermined cycle. The storage device 180 is coupled to the host-to-packet module 140A. The baseboard management controller 110 and the input and output device 120 are respectively located on different circuit boards. In other words, the input and output device 120 is located on the motherboard, but the baseboard management controller 110 is not located on the motherboard. Therefore, serial communication and/or parallel communication are performed between the input and output device 120 and the baseboard management controller 110 through a global bus GB to transmit data access requests. In some embodiments, the main processor 112 and the device processor 124 have different read speeds. In some embodiments, the main processor 112 and the device processor 124 have the same read speed. In some embodiments, the device processor 124 may periodically send a read request, and periodically update the target data in the storage device 180.

In this embodiment, the device processor 124 receives the sensing target data S1 and S2 of the sensing device 122 through a local bus LB2, and transmits the target data S1 and S2 to the packet-to-host module 140B. The packet-to-host module 140B is coupled to the sensing device 122 and the low-voltage differential signaling tunneling protocol and interface 130B. After receiving the read request sent by the device processor 124, the packet-to-host module 140B may form packets of multiple target data S1 and S2 sent from the device processor 124 and send the packets to the low-voltage differential signaling tunneling protocol and interface 130B. Then, the low-voltage differential signaling tunneling protocol and interface 130A is returned through the global bus GB located among multiple data frames DF containing the data DATA. The low-voltage differential signaling tunneling protocol and interface 130A then transmits the packet data to the host-to-packet module 140A to unpack the packet into raw data, and then the raw data is transmitted to the storage device 180 for pre-storage of the target data. For example, before the main processor 112 is in use or has not read the target data S1 and S2, the input and output processor 114 may be in an empty window from work (idle time), prefetch the read request, and pre-store the target data S1 and S2 in a storage device 180 relatively close to the main processor 112. Therefore, when the main processor 112 reads the target data S1 and S2, in addition to reducing the waiting time for reading the target data S1 and S2 in the reading cycle of the main processor 112, the data transmission latency for the main processor 112 to perform serial and parallel transmission through the global bus GB to read the target data S1 and S2 at the input and output device 120 may also be reduced. The raw data may, for example, include voltage sensing data S1, temperature sensing data and/or fan speed sensing data S2, which is not limited in the disclosure.

In this embodiment, the storage device 180 stores the target data S1 and S2 transmitted by the sensing device 122, and establishes a look-up table according to the target data S1 and S2 (please refer to FIG. 9 below). The look-up table records target data values of different modes sensed at predetermined time points for the main processor 112 to inquire. For example, the look-up table may include the voltage value of sensor #1 at the first time point, the voltage value of sensor #1 at the second time point, the voltage value of sensor #2 at the first time point, the voltage value of sensor #2 at the second time point, the temperature value of sensor #1 at the first time point, the temperature value of sensor #1 at the second time point, the temperature value of sensor #2 at the first time point, the temperature value of sensor #2 at the second time point, the fan speed value of sensor #1 at the first time point, the fan speed value of sensor #1 at the second time point, the fan speed value of sensor #2 at the first time point, and the fan speed value of sensor #2 at the second time point, but the disclosure is not limited thereto.

In this embodiment, the main processor 112 transmits the target data S1 and S2 that is inquired from the look-up table to the determining device 190. The determining device 190 has built-in corresponding predetermined threshold ranges for different sensing targets. When the main processor 112 receives the target data S1 and S2 inquired from the look-up table, the main processor 112 determines whether the target data S1 and S2 meet the corresponding predetermined threshold range. If the predetermined threshold range is exceeded, the main processor 112 automatically sends a reminder signal ALM to a higher level (network administrator or user). Therefore, the user may perform remote diagnosis according to the information provided by the determining device 118 and immediately eliminate the problem or abnormal incident caused by the sensing target, so that the elements on the motherboard may continue to operate through the management of the baseboard management controller 110.

FIG. 9 is a sensing target data look-up table according to an embodiment of the disclosure.

Referring to FIG. 9, in one embodiment, the sensing target data look-up table includes voltage parameters VS1 and VS2, temperature parameters TEMP1 and TEMP2, fan speed parameters TACH1 and TACH2, and pulse width modulation parameters PWM1 and PWM2, the disclosure is not limited to these parameters. The time and value corresponding to each parameter may refer to the example in FIG. 9, and this example is for reference only, in which details are not repeated herein. In some embodiments, the main processor inquires the look-up table and outputs the query data to the determining device, in which the main processor decides to read the latest target data or all target data recorded in the look-up table based on requirements. For example, the main processor may read the voltage data at 01:03:05 as 3.1 volts, the temperature data as 30 degrees Celsius and/or the fan speed as 3200 revolution per minute (RPM). Alternatively, in one embodiment, the main processor may read the values of all parameters at all time points. In another embodiment, the main processor may read values of the same parameter or values of different parameters at different time points. In yet another embodiment, the main processor may read only one parameter or any combination of multiple parameter values at the same time point.

Figure 10:
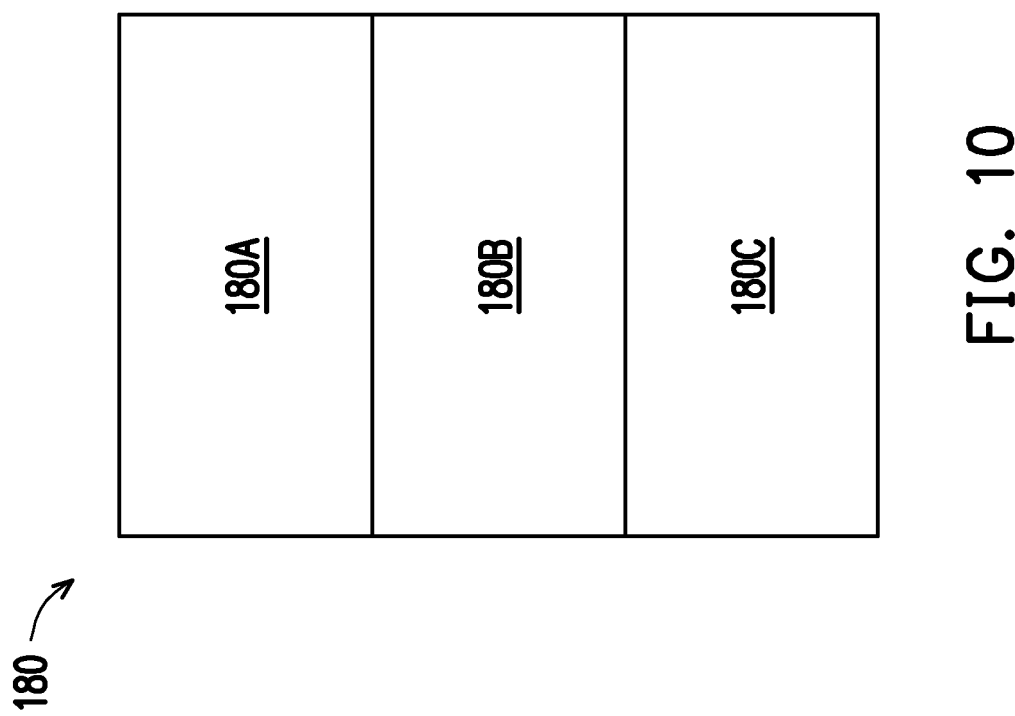
FIG. 10 is a memory block diagram according to an embodiment of the disclosure.

FIG. 10 is a memory block diagram according to an embodiment of the disclosure.

Referring to FIG. 10, the memory block 180 (e.g., it may be a portion of the memory block in the storage device) includes a voltage data memory block 180A, a temperature data memory block 180B, and a fan speed data memory block 180C. In this embodiment, the storage device respectively records information corresponding to the target data at different time points in the pre-configured multiple target data memory blocks 180A, 180B, and 180C, and establishes a look-up table as shown in FIG. 9 based on the information. In some embodiments, one piece of the data read by the main processor from the target data memory blocks 180A, 180B, and 180C is different from the state of the corresponding target data obtained when the sensing device monitors and senses the sensing target. For example, the voltage read by the main processor from the voltage data memory block 180A in the storage device at the first time point is different from the voltage sensed by the sensing device at the first time point. Since the voltage sensed at the first time point has not been transmitted to the storage device, the state or value of the target data in the sensing device is different from the target data in the storage device due to the transmission time and the latency of the main processor while reading the target data. In some embodiments, the multiple target data memory blocks respectively store data in different modes. In some embodiments, each of the target data memory blocks transmits data in a first-in-first-out manner.

Figure 11:
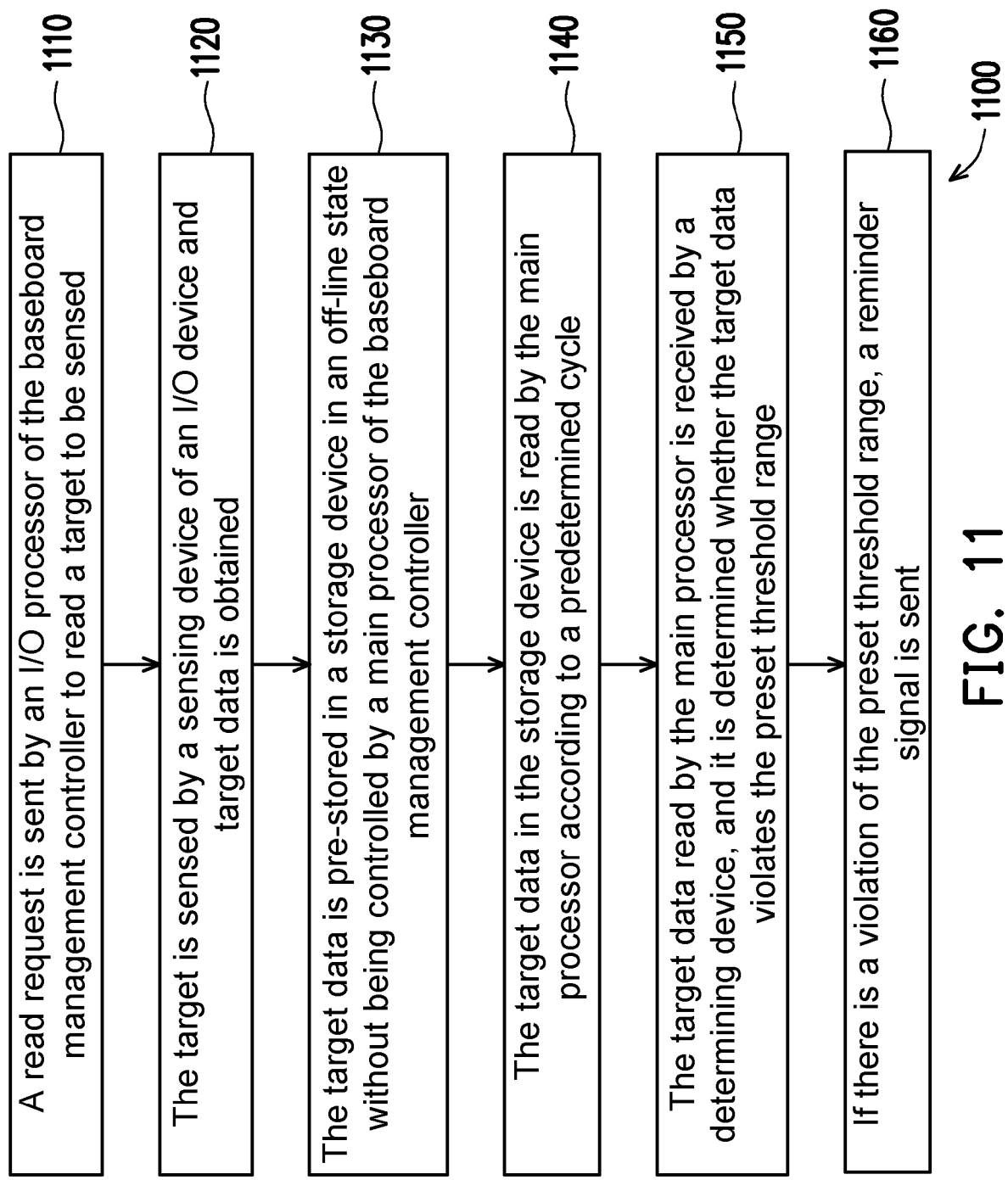
FIG. 11 is a flowchart of a baseboard management control method according to an embodiment of the disclosure.

FIG. 11 is a flowchart of a baseboard management control method according to an embodiment of the disclosure.

Referring to FIG. 11, it may be known from the above embodiments that the baseboard management control method 1100 may include the following steps 1110 to 1160. First, in step 1110, a read request is sent by the input and output processor of the baseboard management controller to read the target to be sensed. In step 1120, the target is sensed by the sensing device in the input and output device and target data is obtained. In step 1130, the input and output processor pre-stores the target data in a storage device in an off-line state without being controlled by the main processor of the baseboard management controller. In step 1140, the main processor reads the target data in the storage device according to a predetermined cycle. In step 1150, the determining device receives the target data read by the main processor, and determines whether the target data violates a preset threshold range. In step 1160, the determining device sends a reminder signal when there is a violation of the preset threshold range.

In some embodiments, the target data may also include system temperature information, system power consumption information, fan speed, fan noise parameters, system clock frequency, interface transmission speed, and other parameters, which are not limited by the disclosure.

In some embodiments, a baseboard management control device is provided. The baseboard management control device includes an input and output device and a baseboard management controller. The input and output device includes a sensing device. The sensing device is coupled to multiple input pins and multiple output pins to respectively sense and write target data. The baseboard management controller includes a storage device and a main processor. The storage device is configured to pre-store the target data. The main processor is coupled to the storage device, and reads the target data in the storage device according to a predetermined cycle. The baseboard management controller and the input and output device are respectively located on different circuit boards.

In some embodiments, the baseboard management controller further includes an input and output processor, which is coupled to the storage device, sends a read request to the sensing device based on the task requirements of the main processor, and pre-stores the target data in the storage device.

In some embodiments, the input and output processor pre-stores the target data in the storage device in an off-line state without being controlled by the main processor.

In some embodiments, the input and output processor sends the read request and updates the target data in the storage device during an empty window from work.

In some embodiments, the baseboard management controller further includes a determining device, which is coupled to the main processor, receives the target data read by the main processor, and determines whether the target data violates a preset threshold range. A reminder signal is sent if there is a violation of the preset threshold range.

In some embodiments, the storage device respectively records information corresponding to the target data at different time points in the pre-configured multiple target data memory blocks, and establishes a look-up table based on the information.

In some embodiments, the main processor inquires the look-up table and outputs the query data to the determining device, in which the main processor decides to read the latest target data or all target data recorded in the look-up table based on requirements.

In some embodiments, one piece of the data read by the main processor from the multiple target data memory blocks is different from the state of the corresponding target data obtained when the sensing device monitors and senses the sensing target.

In some embodiments, the multiple target data memory blocks respectively store data of different modes. In some embodiments, each of the target data memory blocks transmits data in a first-in-first-out manner.

In some embodiments, the main processor and the input and output processor have different read speeds. In some embodiments, the input and output processor is further used to compare whether the target data violates a preset threshold range, and send a reminder signal if there is a violation of the preset threshold range.

In some embodiments, the input and output processor is coupled to the inter-integrated circuit bus, the universal asynchronous receiver/transmitter, and the universal input and output bus.

In some embodiments, the input and output device further includes a device processor, which is coupled to the sensing device, sends a read request to the sensing device based on the task requirements of the main processor, and pre-stores the target data in the storage device.

In some embodiments, the device processor periodically sends the read request and updates the target data in the storage device.

In some embodiments, the target data includes at least system voltage information, system temperature information, and fan speed information.

In some embodiments, a baseboard management control method is provided. The baseboard management control method includes the following operation. A read request is sent by an I/O processor of the baseboard management controller to read a target to be sensed. The target is sensed by a sensing device of an I/O device and target data is obtained. The target data is pre-stored in a storage device in an off-line state without being controlled by a main processor of the baseboard management controller. The target data in the storage device is read by the main processor according to a predetermined cycle. The target data read by the main processor is received by a determining device, and it is determined whether the target data violates a preset threshold range. If there is a violation of the preset threshold range, a reminder signal is sent. The baseboard management controller and the input and output device are respectively located on different circuit boards.

In some embodiments, the input and output processor sends the read request and updates the target data in the storage device during an empty window in a predetermined cycle.

In some embodiments, the baseboard management control method further includes sending the read request and updating the target data in the storage device by the input and output processor during an empty window in the predetermined cycle.

In some embodiments, the baseboard management control method further includes the following steps. The information of the corresponding target data is recorded at different time points in multiple pre-configured target data memory blocks by the storage device, and a look-up table is established based on the information. The look-up table is inquired by the main processor and the query data is output to the determining device. The main processor decides to read the latest target data or all target data recorded in the look-up table based on requirements. Multiple target data memory blocks transmit data in a first-in-first-out manner.

To sum up, the baseboard management control device and the control method thereof of the disclosure may effectively reduce the CPU read latency between the BMC and the host platform module, and reduce the serial/parallel transmission path to achieve the stability of data transmission and effectively improve the CPU read performance, which may more efficiently manage data transmission between the BMC and the host platform module under the distributed hardware system architecture. In addition, the main memory usually uses, for example, chips with an ARM architecture. In comparison, an additional input and output processor is added to the baseboard management controller or an additional device processor is added to the input and output device. These processors only require commercially available microprocessor chips. Therefore, if the input and output processor or the device processor is used to replace the normal function of the main memory, the cost of the chip may be greatly reduced, and at the same time, the latency problem caused by the main memory in the process of transmitting data may be solved.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A baseboard management control device, comprising:
an input and output device, comprising:
a sensing device, coupled to a plurality of input pins and a plurality of output pins to respectively sense and write target data; and
a baseboard management controller, coupled to the input and output device, comprising:
a storage device, pre-storing the target data; and
a main processor, coupled to the storage device and reading the target data in the storage device according to a predetermined cycle,
an input and output processor, coupled to the storage device, sending a read request to the sensing device based on a task requirement of the main processor, and pre-storing the target data in the storage device,
wherein the input and output processor sends the read request and updates the target data in the storage device during an empty window from work before the main processor reads the target data in the storage device according to the predetermined cycle,
wherein the baseboard management controller and the input and output device are respectively located on different circuit boards.

2. The baseboard management control device according to claim 1, wherein the input and output processor pre-stores the target data in the storage device in an off-line state without being controlled by the main processor.

3. The baseboard management control device according to claim 1, wherein the baseboard management controller further comprises:

a determining device, coupled to the main processor, receiving the target data read by the main processor, and determining whether the target data violates a preset threshold range, sending a reminder signal if there is a violation of the preset threshold range.

4. The baseboard management control device according to claim 3, wherein the storage device respectively records information corresponding to the target data at different time points in a pre-configured plurality of target data memory blocks, and establishes a look-up table based on the information.

5. The baseboard management control device according to claim 4, wherein the main processor inquires the look-up table and outputs query data to the determining device, and decides to read latest target data or all target data recorded in the look-up table based on requirements.

6. The baseboard management control device according to claim 4, wherein one piece of data read by the main processor from the target data memory blocks is different from a state of corresponding target data obtained when the sensing device monitors and senses a sensing target.

7. The baseboard management control device according to claim 4, wherein the target data memory blocks respectively store data of different modes.

8. The baseboard management control device according to claim 7, wherein each of the target data memory blocks transmits data in a first-in-first-out manner.

9. The baseboard management control device according to claim 1, wherein the main processor and the input and output processor have different read speeds.

10. The baseboard management control device according to claim 1, wherein the input and output processor is further used to compare whether the target data violates a preset threshold range, and a reminder signal is sent if there is a violation of the preset threshold range.

11. The baseboard management control device according to claim 1, wherein the input and output processor is coupled to an inter-integrated circuit bus, a universal asynchronous transceiver, and a universal input and output bus.

12. The baseboard management control device according to claim 1, wherein the input and output device further comprises:
a device processor, coupled to the sensing device, sending a read request to the sensing device based on a task requirement of the main processor, and pre-storing the target data in the storage device.

13. The baseboard management control device according to claim 12, wherein the device processor periodically sends the read request and updates the target data in the storage device.

14. The baseboard management control device according to claim 12, wherein the baseboard management controller further comprises:
a determining device, coupled to the main processor, receiving the target data read by the main processor, and determining whether the target data violates a preset threshold range, sending a reminder signal if there is a violation of the preset threshold range.

15. The baseboard management control device according to claim 1, wherein the target data at least comprises system voltage information, system temperature information, and fan speed information.

16. A baseboard management control method, comprising:
sending a read request by an input and output processor of a baseboard management controller to read a target to be sensed;
sensing the target by a sensing device of an input and output device and obtaining target data;
pre-storing the target data in a storage device in an off-line state without being controlled by a main processor of the baseboard management controller;
reading the target data in the storage device by the main processor according to a predetermined cycle, sending the read request and updating the target data in the storage device by the input and output processor during an empty window from work before the main processor reads the target data in the storage device according to the predetermined cycle; and
receiving the target data read by the main processor by a determining device, and determining whether the target data violates a preset threshold range, sending a reminder signal if there is a violation of the preset threshold range,
wherein, the baseboard management controller and the input and output device are respectively located on different circuit boards.

17. The baseboard management control method according to claim 16, further comprising:
respectively recording information of the corresponding target data at different time points in a pre-configured plurality of target data memory blocks by the storage device, and establishing a look-up table based on the information, inquiring the look-up table by the main processor and outputting the query data to the determining device, wherein the main processor decides to read latest target data or all target data recorded in the look-up table based on requirements, wherein the target data memory blocks transmit data in a first-in-first-out manner.

* * * * *